United States Patent
Chuang et al.

(10) Patent No.: US 7,557,781 B2
(45) Date of Patent: Jul. 7, 2009

(54) PLANAR DISPLAY STRUCTURE WITH LED LIGHT SOURCE

(75) Inventors: Meng Ju Chuang, Hsinchu (TW); Che-Kuei Mai, Hsinchu (TW)

(73) Assignee: TPO Displays Corp., Chu-Nan (TW)

( * ) Notice: Subject to any disclaimer, the term of this patent is extended or adjusted under 35 U.S.C. 154(b) by 0 days.

(21) Appl. No.: 10/336,822

(22) Filed: Jan. 6, 2003

(65) Prior Publication Data
US 2004/0130515 A1 Jul. 8, 2004

(51) Int. Cl.
G09G 3/30 (2006.01)
(52) U.S. Cl. .............................. 345/82; 345/76; 345/84; 345/87; 345/102
(58) Field of Classification Search .................... 345/39, 345/82, 1.1, 1.3, 33, 55, 76, 84, 87, 102; 313/498, 500; 362/227, 249
See application file for complete search history.

(56) References Cited

U.S. PATENT DOCUMENTS 3,918,053 A * 11/1975 Towne et al. ........... 340/815.45
4,254,453 A * 3/1981 Mouyard et al. ............ 362/240
5,528,709 A * 6/1996 Koike et al. .................... 385/14
5,722,767 A * 3/1998 Lin ............................. 362/249
6,265,706 B1 * 7/2001 Oliver et al. ............. 250/208.1
6,601,962 B1 * 8/2003 Ehara et al. .................... 362/31
6,817,123 B2 * 11/2004 Okazaki et al. ............... 40/452
2001/0019378 A1 * 9/2001 Yamaguchi .................. 349/61
2002/0005826 A1 * 1/2002 Pederson ...................... 345/82
2002/0047837 A1 4/2002 Suyama et al.
2003/0156425 A1 * 8/2003 Turnbull et al.

OTHER PUBLICATIONS

"thickness", Merriam-Webster Dictionary, http://www.merriam-webster.com/dictionary/along, 2008, pp. 1-2.*

* cited by examiner

Primary Examiner—My-Chau T Tran
(74) Attorney, Agent, or Firm—Liu & Liu

(57) ABSTRACT

A planar display structure with LED light source includes a plane light source constituted by a plurality of LEDs and a light guide plate, wherein the light guide plate has a plurality of recesses that the above LEDs can be put into.

22 Claims, 4 Drawing Sheets

PLANAR DISPLAY STRUCTURE WITH LED LIGHT SOURCE

BACKGROUND OF THE INVENTION

1. Field of the Invention

The present invention generally relates to a planar display structure, and more particularly to a planar display structure with LED (light emitting diode) light source.

2. Description of the Prior Art

Presently many display devices need to use plane light sources, such as transmissive-type/reflective-type liquid crystal display (LCD) or scanner so that the development of plane light source art is fast and attentive. The light source mainly used by LCD device is constituted by line light source formed with LED or cold cathode fluorescent lamp (CCFL). The light rays emitted from the light source at a lateral end of wedge light guide plate are guided almost vertically into the panel by the wedge light plate. The above structure is referred to U.S. Pat. No. 6,309,080, surface light source device and liquid crystal display. It has a main disadvantage that the light rays emitted from plane light source are not well distributed, in other words, the illumination of the portion of wedge light guide plate near the light source is higher than the other portion. Besides, the unsteady matter of CCFL that shortens the lift cycle of device is a drawback, too.

A method to solve the above problems is referred to US patent publication number 20020047837, which uses a array constituted by EL (electro-luminescent) components to replace plane light source that guides vertically the light rays into the panel by-light guide plate.

LED is a lighting component with low electricity and high illumination, and it has the steady lighting matter and long life cycle, too. It is very suitable for plane light source with LED as light source. Please refer to FIG. 1, a conventional structure of plane light source with LED light source is shown. The array constituted by LED 102 on a substrate 100 is used as plane light source. A light guide plate 104 is placed above the LED array 102 so that the light rays emitted from LEDs 102 can be well distributed. There are sequentially a first diffusor sheet 106, a prism sheet 108, and a second diffusor sheet 110 on the light guide plate 104 for the light rays emitted from the emitting surface of light guide plate 104 can be further well distributed. The above structure of plane light source is used as a back light source of LCD panel 120.

However, the aforementioned structure of plane light source has many drawbacks. First, the light rays emitted into the light-receiving surface of light guide plate 104 are not distributed. As shown in FIG. 1, the illumination of the section A of light guide plate 104 is darker than the section over LED 102 because the illuminating area of each LED is finite. A method that shortens the distance between two LEDs to decrease the area of the section A of light guide plate 104 can solve this problem. When the distance B in FIG. 1 is shortened, in other words, it will need the additional LEDs in the condition of same illuminated area. So this method is helpless to reduce manufacturing cost.

It is another method can solve the above problem to enlarge the thickness of light guide plate. As shown in FIG. 2, the area of the section A of light guide plate 105 is zero while the thickness of light guide plate is increased to a predetermined value. However, it is disadvantageous for minimizing volume and diminishing weight of electric devices. Besides, the manufacturing cost of light guide plate 105 is increased, too.

The utilization of light rays is not best in the conventional structure of light source because some of the light rays emitted from LEDs are reflected by light guide plate when the light rays enter into light guide plate. As shown in FIG. 1 and FIG. 2, the light rays C emitted from LEDs 102 will be reflected by the light guide plate 104 and 105 so that the utilization of light rays is worse. The above phenomenon still exists when the additional LEDs is used or the thickness of light guide plate is enlarged.

SUMMARY OF THE INVENTION

In the light of the state of the art described above, it is an object of the present invention to provide a light guide plate with a plurality of recesses that the LEDs can be put into which is immune to the problems of the conventional planar light structure described above and which can decrease the whole thickness of planar display structure because the light rays emitted from light guide plate are well distributed while the thickness of light guide plate is not enlarged.

It is also an object of this invention to decrease the numbers of LEDs for the distance between LEDs is not changed.

It is another object of this invention to increase the utilization of light rays of light guide plate.

It is a further object of this invention to decrease the ratio of reflected or fully reflected light rays for a plurality of slanted portions (V-cuts) on the inner surface of recess can guide the light rays emitted from LEDs into light guide plate in the predetermined angle.

In view of the above and other objects which will become apparent as the description proceeds, there is provided according to a general aspect of the present invention a planar display structure with LED light source which comprises a plane light source constituted by a plurality of LEDs (light emitting diode); and a light guide plate having a plurality of recesses, wherein each LED can be put into a recess.

Base on the idea described above, wherein the LEDs are on a substrate.

Base on the aforementioned idea, wherein the substrate is selected from the group consisting of PCB (printed circuit board) and FPC (flexible printed circuit board).

Base on the idea described above, wherein the recess can cover the lighting portion of the LED.

Base on the aforementioned idea, wherein the recess can cover the whole LED.

Base on the idea described above, wherein the inner surface of the recess is dealt with a diffusion process.

Base on the aforementioned idea, wherein the diffusion process forms a plurality of slanted portions (V-cuts) on the inner surface of the recess.

Base on the idea described above, wherein the cross-section view of the recess is selected from the group consisting of circle, ellipse, and polygon.

Base on the aforementioned idea, wherein the pattern of array constituted by the LEDs is selected from the group consisting of rectangle-type and interlacing-type.

Base on the idea described above, wherein the light-emitting surface of the light guide plate is dealt with a diffusion process.

Base on the aforementioned idea, wherein the diffusion process forms a plurality of slanted portions (V-cuts) on the light-emitting surface of the light guide plate.

Base on the idea described above, wherein the LEDs and the light guide plate are made with the design of All-in-One.

Base on the aforementioned idea, wherein the LEDs are constituted by the lighting units that have red, green, and blue LEDs.

Base on the idea described above, wherein the LED is a white LED.

There is provided according to a general aspect of the present invention a back light source of LCD display device which comprises a substrate; a plane light source constituted by a plurality of LEDs located on the substrate; a light guide plate on the substrate and the LEDs including a plurality of recesses that the LEDs can be put into, wherein the inner surface of the recess and the light-emitting surface of the light guide plate are dealt with a diffusion process; a first diffusor sheet on the light guide plate; a prism sheet on the first diffusor sheet; and a second diffusor sheet on the prism sheet.

Base on the idea described above, wherein the substrate is selected from the group consisting of PCB (printed circuit board) and FPC (flexible printed circuit board).

Base on the aforementioned idea, wherein the recess can cover the lighting portion of the LED.

Base on the idea described above, wherein the recess can cover the whole LED.

Base on the aforementioned idea, wherein the diffusion process forms a plurality of slanted portions (V-cuts) on the inner surface of the recess and the light-emitting surface of the light guide plate.

Base on the idea described above, wherein the cross-section view of the recess is selected from the group consisting of circle, ellipse, and polygon.

Base on the aforementioned idea, wherein the pattern of array constituted by the LEDs is selected from the group consisting of rectangle-type and interlacing-type.

Base on the idea described above, wherein the LEDs are constituted by the lighting units that have red, green, and blue LEDs.

Base on the aforementioned idea, wherein the LED is a white LED.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
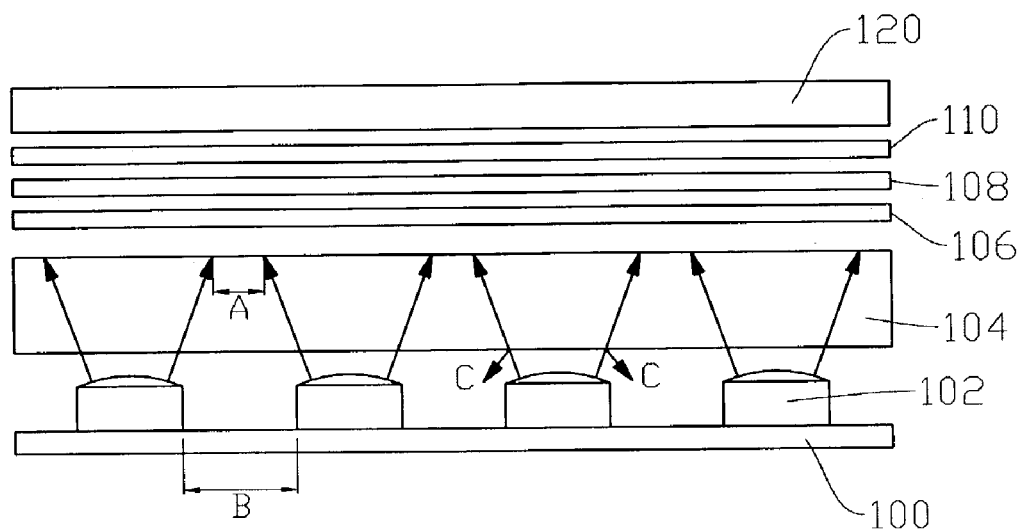
FIG. 1 illustrates a view of conventional planar light structure with LED light source.
Figure 2:
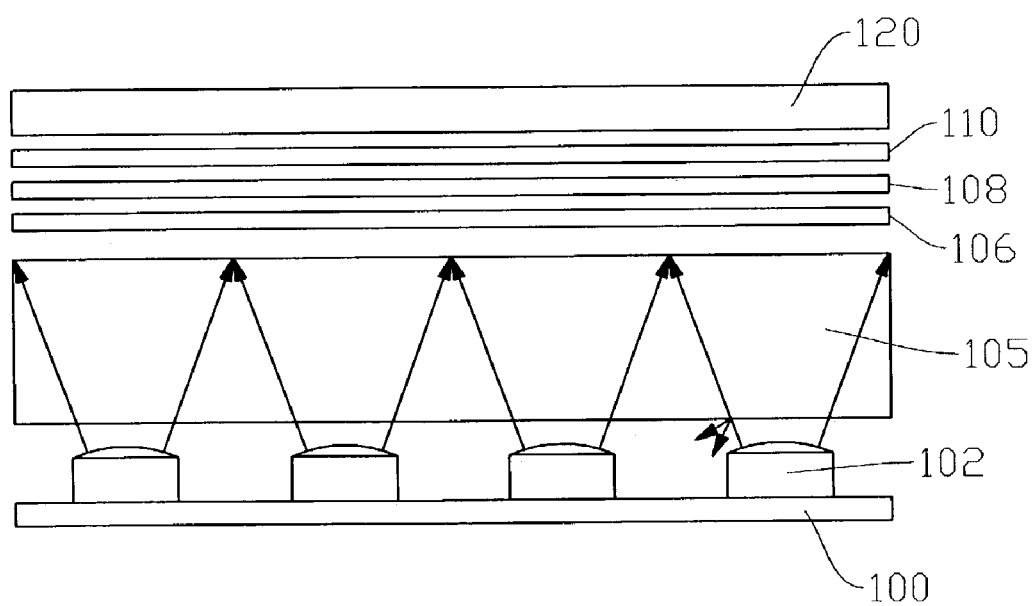
FIG. 2 illustrates another view of conventional planar light structure with LED light source.

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Next, a planar display structure with LED light source is illustrated according to this invention. Please refer to FIG. 3, a plane light source is constituted by a plurality of LEDs 12 on a substrate 10. The substrate 10 can be printed circuit board (PCB) or flexible printed circuit board (FPC). The LEDs 12 are welded on the substrate 10 and electrically connected to power supply by the circuit on the substrate 10. A light guide plate 14 is placed above the substrate 10 and the LEDs 12, and the upper edge surface of light guide plate 14 is a light-emitting surface 142. The lower edge surface of the light guide plate 14 is a light receiving surface 141.

There are a plurality of recesses 15 on the lower edge surface of light guide plate 14. Each recess is used to cover the lighting portion of LED 12. This structure can make the light rays emitted from LEDs 12 to be well distributed so that the thicker light guide plate is not needed while the lighting portion of LED 12 is fully covered. Besides, additional LEDs are not needed for increasing the illumination because the distance between LEDs remains the original length. It is another advantage that the ratio of reflected or fully reflected light rays by the light guide plate 14 are substantially decreased while the light rays emitted from LEDs 12 enter into the light guide plate 14, in other words, the utilization of light rays is increased. The thickness of whole planar display structure can be reduced because the lighting portion of LED 12 is put into the recess 15 of light guide plate. The above structure with the well-distributed property for light rays can directly use as back light source of LCD panel 30.

Figure 3:
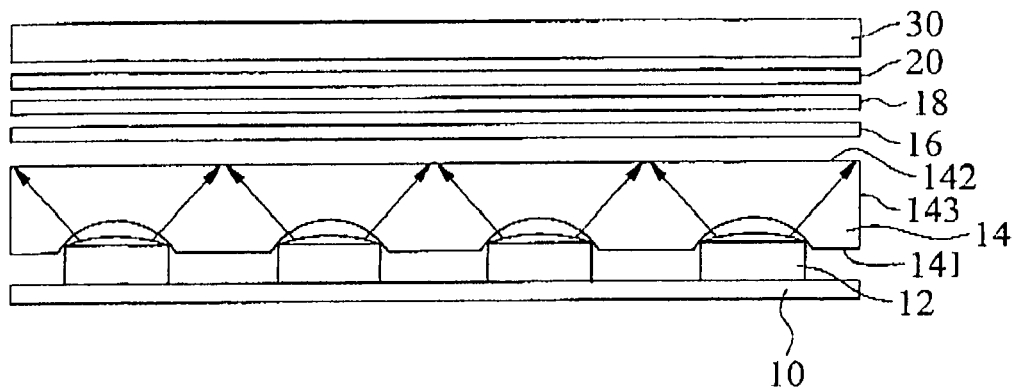
FIG. 3 illustrates the first preferred embodiment of planar light structure with LED light source according to the present invention.

As shown in FIG. 3, the light guide plate 14 has side surfaces 143 at edges of the light receiving surface 141 and the light emitting surface 142. The side surfaces 143 each has an area significantly smaller than the area of each of the light emitting surface 142 and the light receiving surface 141. There is no LED positioned with light received through the side surfaces 143.

There are sequentially a first diffusor sheet 16, a prism sheet 18, and a second diffusor sheet 20 on the light guide plate 14. This structure can make the light rays emitted from the light-emitting surface of light guide plate 104 to be further well distributed. It is proper to use the aforementioned structure as back light source of LCD panel 30, too.

Figure 4:
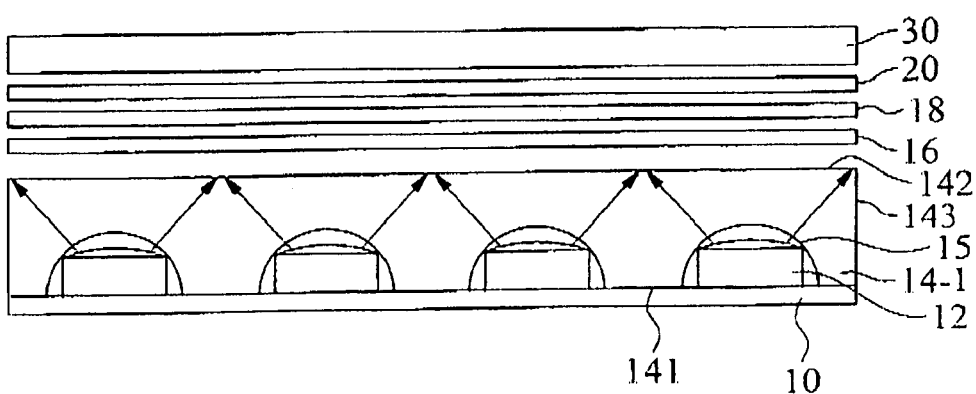
FIG. 4 illustrates the second preferred embodiment of planar light structure with LED light source according to the present invention.

It is another preferred embodiment according to the present invention as shown in FIG. 4. The depth of recess 15 located on the light guide plate 14-1 is deep enough to put the whole LED 12 into the recess 15 so the substrate 10 can be adhered on the light guide plate 14-1. Not only this design has the advantages of first embodiment according to the present invention, but also the thickness of whole planar display structure can be further reduced for the purpose of minimizing volume.

Figure 5:
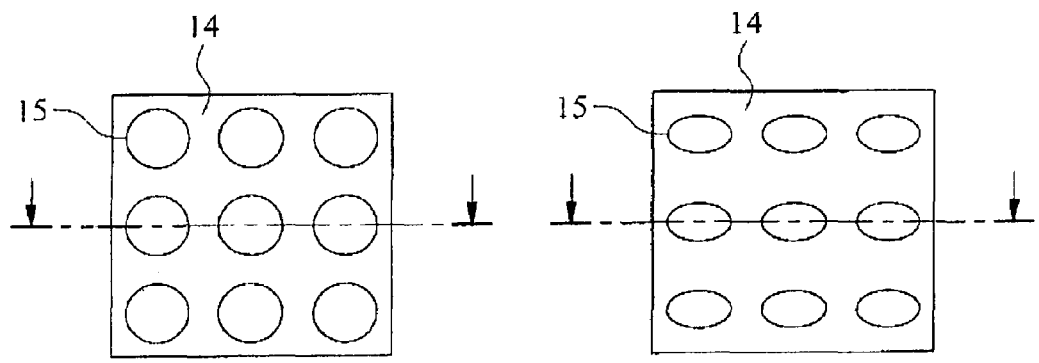
FIG. 5 shows the top view of light guide plate according to the present invention, wherein the recesses have different shapes.

FIG. 5 is the top view of light guide plate 14 according to the present invention. The geometrical pattern of recess 15 on light guide plate 14 can be circle, ellipse or other shapes to make the LED, which is put into the recess 15, has best illuminant effect for light guide plate 14 only. The LED can be a white LED or one lighting unit that includes red, green, and blue LEDs. Of course, any lighting devices that emit white light can replace the above LED.

Figure 6:
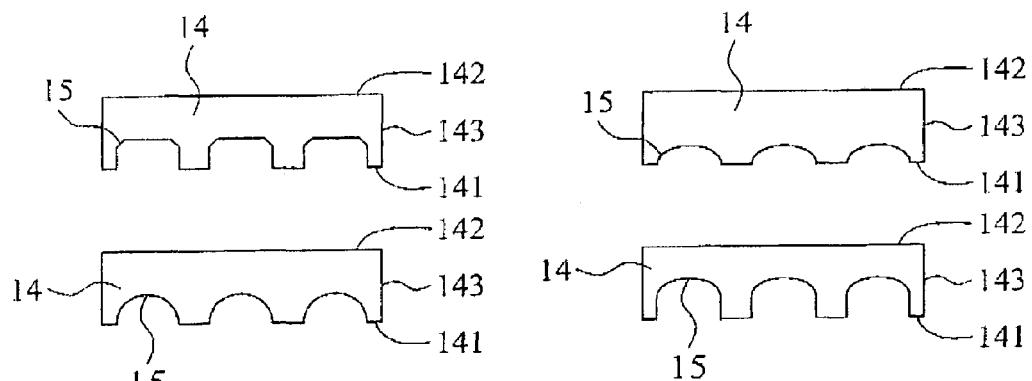
FIG. 6 shows the cross-section view of recesses according to the present invention.

Please refer to FIG. 6, a cross section view of recess 15 according to the present invention is shown. The cross section of recess 15 can be a portion of circle, ellipse, polygon or other shapes to make the LED, which is put into the recess 15, has best illuminant effect for light guide plate 14 or the light rays, which are emitted from the LED, enter into the light guide plate 14 in the proper angle for reducing the ratio of reflected or fully reflected light rays. Besides, the inner surface of recess 15 can be dealt with a diffusion process, which forms convex/concave dots or a plurality of slanted portions (V-cuts) thereon, so the light rays emitted from the LED easily enter into the light guide plate 14 for decreasing the ratio of reflected or fully reflected light rays. Similarly, the light-emitting edge surface of light guide plate 14 can be too dealt with a diffusion process, which forms convex/concave dots or a plurality of slanted portions (V-cuts) thereon, for the light rays are easily guided out from the light-emitting surface of light guide plate 14.

Figure 7:
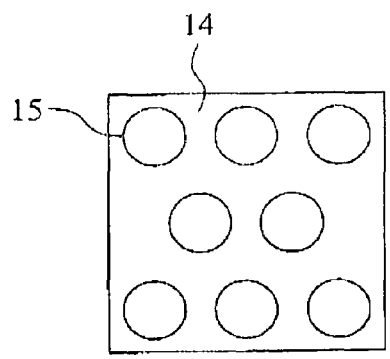
FIG. 7 illustrates the recesses and LEDs are arranged in interlacing-type according to the present invention.

FIG. 7 shows the arranged figure of recesses 15 or the pattern of array constituted by LEDs in interlacing-type according to the present invention. It is the pattern of interlacing-type with two different lines in FIG. 7. However, the recesses or LEDs in interlacing-type with three or more different lines can be use in the present invention. The above arrangements of recesses 15 are all rectangle-type, but an irregular pattern of recesses 15 can be used, too.

Figure 8:
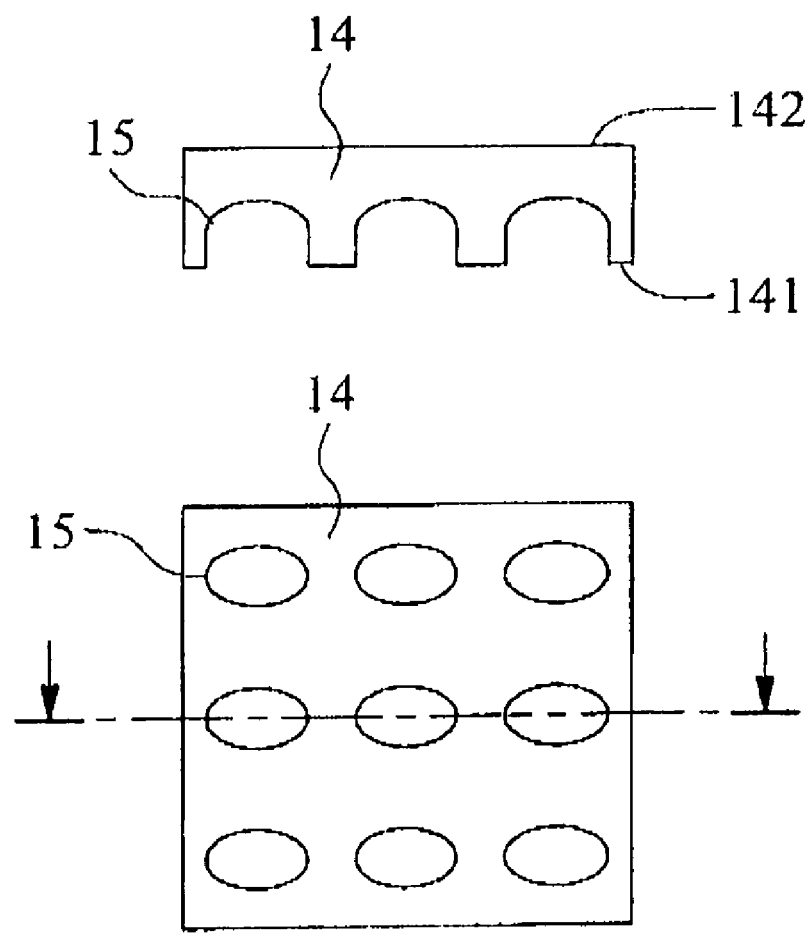
FIG. 8 illustrates the geometrical patterns and depths of recesses according to the present invention.

Please refer to FIG. 8, the length of long axis (as the dash line in FIG.) of recess 15 on light guide plate 14 is between from about 0.1 to about 10 cm and the length of short axis of recess 15 is between from about 0.1 to about 10 cm. Two depths of recess 15 can be chosen, one is between from about 0 to about 5 cm, and the other is between from about 0 to about 10 cm.

Besides, the LEDs and the light guide plate in the present invention can be made with the design of All-in-One.

There are many advantages to put LED into the recess on the lower surface of light guide plate. First, the light rays emitted from the light-emitting surface of light guide plate are well distributed because the whole lighting portion of LED is covered, in other words, the thicker light guide plate is not needed. Next, additional LEDs are not used for increasing the illumination because the distance between LEDs remains the original length. Besides, the ratio of reflected or fully reflected light rays by the light guide plate are substantially decreased while the light rays emitted from LEDs enter into the light guide plate so the illumination is increased for the utilization of light rays is high.

When the depth of recess on the light guide plate is deep enough to put the whole LED into the recess so the substrate can be adhered on the light guide plate. The thickness of whole planar display structure can be further reduced to finish the purpose of minimizing volume.

Convex/concave dots or a plurality of slanted portions (V-cuts) on the inner surface of recess can make the light rays emitted from the LED easily enter into the light guide plate 14 in the proper angle for decreasing the ratio of reflected or fully reflected light rays. This design makes the LED in the recess to have best illumination for light guide plate.

Although specific embodiments have been illustrated and described, it will be obvious to those skilled in the art that various modifications may be made without departing from what is intended to be limited solely by the appended claims.

What is claimed is:

1. A planar light source, comprising:
a plurality of LEDs in a two dimensional array; and
a planar light guide plate, comprising a light emitting surface and a light receiving surface, wherein the light receiving surface has a two dimensional array of recesses receiving the LEDs, and wherein the recesses each has an inner surface that faces away from the light emitting surface and interacts with light emitted from the LED received in the recess to facilitate diffusion of light to the light emitting surface.

2. The planar light source as in claim 1, wherein the light emitting surface is generally parallel to the light receiving surface.

3. The planar light source as in claim 1, wherein the planar light guide plate has side surfaces at edges of the light receiving surface and the light emitting surface, wherein the side surfaces each has an area significantly smaller than the area of each of the light emitting surface and the light receiving surface.

4. The planar light source as in 1, wherein the plurality of LEDs are supported on a substrate and said substrate is selected from the group consisting of PCB (printed circuit board) and FPC (flexible printed circuit board).

5. A planar light source, comprising:
a plurality of LEDs in a two dimensional array; and
a planar light guide plate, comprising a light emitting surface and a light receiving surface, wherein the light receiving surface has a two dimensional array of recesses receiving the LEDs, and wherein the planar light guide plate comprises a planar body having the light receiving surface and the light emitting surface, wherein light received at the light receiving surface is transmitted to the light emitting surface through the body of the light guide plate, and wherein each recess is provided in the body having an inner surface facing away from the light emitting surface and sized to cover entire light emitting portion of an LED received in the recess.

6. The planar light source as in claim 1, wherein each recess is sized to receive a whole LED.

7. The planar light source as in claim 1, wherein the LEDs are supported on a substrate, and each recess is sized to receive a LED, and wherein the substrate is positioned against the light guide plate, with the LEDs received in the recesses, thereby reducing overall thickness of the planar light source.

8. The planar light source as in claim 1, wherein the inner surface of each recess has at least a plurality of slanted portions (V-cuts), convex dots, or concave dots.

9. The planar light source as in claim 1, wherein the inner surface of each recess has a cross section that is at least a circle, ellipse, or polygon.

10. The planar light source as in claim 1, wherein the inner surface of each recess has a geometrical pattern of at least a circle or ellipse.

11. The planar light source as in claim 1, wherein the two dimensional array of LEDs are arranged in a pattern of at least rectangular-type or interlacing type.

12. The planar light source as in claim 1, wherein each LED comprises at least one of a white LED, or a lighting units that includes at least red, green, and blue LEDs.

13. The planar light source as in claim 1, further comprising at least one of a diffuser sheet or a prism sheet disposed at the light emitting surface.

14. The planar light source as in claim 1, wherein the light guide plate has side surfaces at edges of the light receiving surface and the light emitting surface, and wherein there is no LED positioned with light received through the side surfaces.

15. An LCD device, comprising:
a planar light source as in claim 1; and
an LCD panel positioned relative to the light emitting surface, receiving light emitted from the light emitting surface.

16. The LCD device as in claim 15, wherein the LCD panel is positioned parallel to the light emitting surface.

17. The LCD device as in claim 15, wherein the LCD panel comprises a generally planar surface towards the light emitting surface of the planar light source.

18. The LCD device as in claim 17, further comprising a diffuser sheet and a prism sheet disposed between the LCD panel and the light emitting surface of the planar light source.

19. The LCD device as in claim 18, wherein the diffuser sheet comprises a first diffuser sheet and a second diffuser sheet, between which the prism sheet is disposed.

20. The LCD device as in claim 15, wherein the LEDs are supported on a substrate, and each recess is sized to receive a LED, and wherein the substrate is positioned against the light guide plate, with the LEDs received in the recesses, thereby reducing overall thickness of the planar light source.

21. A planar light source, comprising:
a plurality of light sources in a two dimensional array; and
a planar light guide plate, comprising a light emitting surface and a light receiving surface, wherein the light receiving surface has a two dimensional array of recesses receiving the light sources, and wherein the recesses each has an inner surface that faces away from the light emitting surface and interacts with light emitted from the LED received in the recess to facilitate diffusion of light to the light emitting surface.

22. The planar light source as in claim 21, wherein the light sources comprises LEDs.

\* \* \* \* \*